United States Patent
Grote et al.

(10) Patent No.: US 11,098,838 B2
(45) Date of Patent: Aug. 24, 2021

(54) PIG FOR PIPELINES

(71) Applicant: ROSEN Swiss AG, Stans (CH)

(72) Inventors: Matthias Grote, Lingen (DE); Frank Fielers, Lingen (DE); Tilman Mönster, Lengerich (DE)

(73) Assignee: ROSEN SWISS AG

( * ) Notice: Subject to any disclaimer, the term of this patent is extended or adjusted under 35 U.S.C. 154(b) by 322 days.

(21) Appl. No.: 16/256,616

(22) Filed: Jan. 24, 2019

(65) Prior Publication Data
US 2019/0226625 A1     Jul. 25, 2019

(30) Foreign Application Priority Data

Jan. 24, 2018 (DE) .................. 102018101608.5

(51) Int. Cl.
| | |
|---|---|
| B08B 9/055 | (2006.01) |
| B08B 9/04 | (2006.01) |
| F16L 55/40 | (2006.01) |
| F16L 55/38 | (2006.01) |
| F16L 55/48 | (2006.01) |
| F16L 101/12 | (2006.01) |

(52) U.S. Cl.
CPC ............ *F16L 55/40* (2013.01); *B08B 9/0557* (2013.01); *F16L 55/38* (2013.01); *F16L 55/48* (2013.01); *F16L 2101/12* (2013.01)

(58) Field of Classification Search
CPC ............. B08B 9/055; B08B 9/04; F16L 55/40
See application file for complete search history.

(56) References Cited

U.S. PATENT DOCUMENTS

| 9,176,052 B2 | 11/2015 | Tunheim et al. | |
|---|---|---|---|
| 2003/0136195 A1 | 7/2003 | Krieg et al. | |
| 2003/0198374 A1 | 10/2003 | Hagene et al. | |
| 2008/0072963 A1* | 3/2008 | Strohmeier | F16L 55/46 137/15.13 |
| 2010/0017980 A1 | 1/2010 | Filippovitch | |
| 2010/0162503 A1* | 7/2010 | Rosen | B08B 9/035 15/104.061 |
| 2014/0216587 A1* | 8/2014 | Khalifa | F16L 55/18 138/97 |
| 2016/0273992 A1 | 9/2016 | Frueh | |
| 2017/0009930 A1* | 1/2017 | Larink | B08B 9/055 |

FOREIGN PATENT DOCUMENTS

| DE | 3719492 A1 | 12/1988 |
|---|---|---|
| DE | 102008035996 A1 | 2/2010 |
| EP | 1637833 A1 | 3/2006 |
| JP | 5306795 B2 | 11/1993 |

* cited by examiner

*Primary Examiner* — Michael D Jennings
(74) *Attorney, Agent, or Firm* — Husch Blackwell LLP

(57) ABSTRACT

A pig for pipelines, in particular in the form of a cleaning or inspection pig, with a central unit and at least one, in the longitudinal direction of the central unit, front and one rear sealing unit. The pig also includes at least one sensor device comprising a plurality of sensor arms, which is provided in particular for the measurement of a geometry or condition of the pipeline. At least one of the sealing units and preferentially the central unit are produced from a plastic material at least in sections. At least one sensor arm, distant from the central unit, is connected to one of the sealing units.

18 Claims, 7 Drawing Sheets

PIG FOR PIPELINES

CROSS REFERENCE

This application claims priority to German Application No. 10 2018 101 608.5, filed Jan. 24, 2018, the entirety of which is hereby incorporated by reference.

FIELD OF THE INVENTION

The present invention relates to a pig for pipelines, in particular in the form of a cleaning or inspection pig, with a central unit and at least one, in the longitudinal direction of the central unit, front and rear sealing unit, and with a sensor device comprising a plurality of sensor arms, which is provided in particular for the measurement of a geometry or condition of the pipeline, wherein at least one of the sealing units and preferentially the central unit are produced from a plastic material at least in sections.

BACKGROUND

From the prior art according to WO 2013/102807 a generic pig is known which by the use of plastic is formed so light in sections that upon a destruction of the pig during the operation the individual parts can be flushed out with the liquid transported in the pipeline.

As a means for regulating the speed of the pig transported with the fluid in the pipeline, the configuration of the sensor arms on the one hand and the design of the disks covering the free pipeline cross section in a central region are provided. In a version having a plastic foam material plug, the use of an "artificial muscle" is complementarily provided, which can taper a passage through the central unit and thus vary the propulsion. However, the shown pigs are little suited for gas lines with low pressure or for pipelines with low fluid speeds, since on the one hand the free pipeline cross section is either not covered sufficiently or, because of the foam material plug, the friction on the pipe wall is too high. In particular when passing through bends or when passing over weld seams, friction peaks develop which can result in a reduction of the speed, thus in an unsteadier run and poorer measurement results.

SUMMARY OF THE INVENTION

A pig according to the invention is characterized in that at least one sensor arm, distant from the central unit, is connected to one of the sealing units. Preferentially, all sensor arms of a sensor rim of a sensor device comprising sensor arms running about a longitudinal center axis in the circumferential direction are connected to the abutting sealing unit.

The sensor arm or sensor arms are formed in particular on the end side and at least in a region that is spaced furthest away from the central center axis of the pig in the pipeline either directly for lying against a pipe inner side or with an end side sensor arm module for lying against the pipe inner side. Through the connection of the in particular front or rear sealing unit with the sensor arm or sensor arms a coupling mechanism is created, by way of which the differential pressures acting on the sealing unit and radial forces accompanying this have an influence on the contact of the sensor arms or the modules supported by these. By way of such a coupling mechanism, the forces created through contact regions of the pig on the pipeline inner side can be positively influenced in the sense of a uniform and steady pig run. Thus, a pig according to the invention is suited for producing better measurement results.

The sealing unit preferentially is not a straight disk but a sealing unit with an areal extension (cup) which does not exclusively extend perpendicularly to the longitudinal center axis of the pig.

The longitudinal center axis of the pig is the axis which in a horizontally extending pipeline runs parallel or congruently to the longitudinal access of the same.

Advantageously, the connection between sensor arm and sealing unit is arranged distantly from the central unit via a flexible section of the sensor arm, so that the influence of the forces acting on the sealing unit because of differential pressures on the sensor arm is greater. In the region near the central unit and near the longitudinal center axis, the sensor arms are generally formed slightly stiffer so that a connection located there has less influence on the alignment of the sensor arm. Advantageously, viewed from the longitudinal center axis of the pig, the connecting region between sensor arm and sealing unit is arranged in the outer half of the sensor arm, preferentially in the outer third.

Viewed in a longitudinal direction of the pig, the sealing unit comprises at least one areal element leading about the central unit, which is codefined in particular by the sensor arm. The sensor arms impart a certain shape on the sealing unit or at least support the same. The areal element assumes the sealing function otherwise performed by conventional cups or disks and, viewed in the longitudinal direction, usually extends away from the central unit concentrically to the outside. Viewed in this direction, it has a diameter that is adapted to the respective pipe inner wall.

A respective sealing unit is attached for example flanged to the central unit relative to the longitudinal center axis of the pig in the usual manner. Often, the central unit comprises in particular pressure-encapsulated regions for electronics and establishes a connection between for example a front and a rear sealing and/or support element. For example, a front or a rear sealing unit according to the invention is connected to one or more sensor arms, wherein for the sensor unit(s), a 2-point support on the central unit materializes, while the further sealing unit that may then be present is likewise arranged on the central unit if appropriate without additional attachment to one or more sensor arms. Complementarily to a configuration of a pig according to the invention, a means for the speed control, for example in the form of a regulatable bypass, can likewise be arranged in the central unit. Because of this, sensor data detected during operation on account of the well-controlled, even run that is then possible are of a particularly high quality.

Sealing unit and sensor arm can comprise a connecting region such that they are continuously connected to one another or only lie against one another and then, in the case of a differential pressure loss, influence one another in the sense of force transmission.

While with conventional cups in the case of a differential pressure increase the friction on the pipe inner side is increased through the shape of the cup, the sealing unit on its side facing forward in the travelling direction has at least one face, the surface normal of which viewed in a longitudinal section is inclined in the direction of the longitudinal axis of the pig. By way of this, a friction moment that is created by the differential pressure is not increased further. On the contrary, an axial force is created as a result, by way of which an increase in friction generated by the differential pressure if offset with the objective of an even propulsion.

A particularly even run is achieved when on the end side of the sensor arm a means designed in particular as wheel is present for guiding the pig. Alternatively, a sensor module or a support element that is provided in particular with a ceramic can also be present in this location, which can also be formed by the sensor arm itself. The sealing unit, which viewed in the longitudinal direction substantially seals a free pipeline cross section, can, notwithstanding the connection, remain limited to the sealing tasks while the sensor arms with the means for guiding the pig located on the outside accordingly bring about the guidance of the same. In particular in bent passages of the pipeline, in which friction-generating canting of the sealing planes are created, a more even run is created through the coupling of sealing unit and guide means comprising sensor arms according to the invention.

The purpose of a simple construction of the pig and design for the respective pipeline to be traveled through it is advantageous furthermore when the sealing unit and the sensor arms connected with the same form a module that is preferentially detachably fixed to the central unit.

The object set at the outset is likewise solved through a generic pig which is characterized in that the sensor device comprises a light guide running in the or along the sensor arm, which is designed at least for measuring the curvature of a sensor arm. Such a light guide in particular in the form of at least one optical fiber can be optimally adapted to a sensor arm constructed of a plastic material and in particular integrated in such, so that omitting heavy metallic sensor elements, a particularly light sensor rim with a multiplicity of sensor arms is created. At the same time, the elastic properties of the sensor arm are not at all influenced or only slightly by the light guide running in the sensor arm or along the sensor arm and which is in particular likewise formed from plastic, so that the sensor arm can be designed more simply and thus the friction with the pig according to the invention, in particular in a design described above or below, is optimally adjustable. In particular, a sensor arm is at least substantially constructed of a glass fiber-reinforced plastic, in which a light guide provided with a plastic-encased glass fiber core is introduced. Here, the mechanical properties of sensor arm and light guide in particular with regard to the elongation, fatigue strength and the force introduction can be optimally matched to one another.

It is to be understood that a suitable intelligence is available in the pig for such a light guide, which is typically represented by an interrogator.

For measuring the curvature of the sensor arm, the light guide, which extends in particular in the longitudinal direction of the sensor arm, preferentially comprises a plurality of Bragg gratings or a plurality of Bragg gratings is assigned to the light guide. The Bragg gratings are in particular integrated in the light guide. Because of this, the curvature of the sensor arms can be measured in a multiplicity of sections, so that a very accurate picture of the movement of the sensor arm can be created. This is advantageous in particular when passing through bends, when the pigs do not run in the middle of the pipe, for example gyroscopes arranged on the pig receive errors and the same, through a precise positioning by way of the curvature of the sensor arms by sections, can then be eliminated by calculation. This is accompanied, in particular, with the pig moved easily and evenly through the pipeline.

Advantageously, the light guide with the Bragg grating can be arranged in or on the sensor arm angled relative to the longitudinal center axis of the sensor arm. By way of this, a torsion of the sensor arm, which usually has a leaf spring-like shape, can also be determined. In particular, the light guides and the Bragg grating or gratings inscribed into the same are arranged at an angle between 30° to 60° relative to the longitudinal axis. A shear stress that is preferentially maximal for the determination of the torsion is obtained in an angle between longitudinal axis of the sensor arm and that of the light guide of 45°.

Besides the advantageous leaf spring-like designs of the sensor arms, these can also be present in other flat, pliable forms, preferentially for the improved covering of the pipe inner side, widened at the end side and curved, i.e. adapted to the curvature of the pipeline wall.

When a sensor arm is designed which is fixed to the central unit on both of its ends, certain regions for contacting the pipe inner wall are located approximately in the middle of the longitudinal extension, so that the form in a lateral view corresponds for example to an arc of a circle or arc of an ellipse.

For determining the curvature or torsion, calibration curves can be used which are created prior to a measurement run using the imaginary sensor arms or sensor arms that are identical thereto, and which can be determined by determining the wave length shifts of certain used wave lengths with different curvatures and torsions of the sensor arm.

A fiber Bragg grating is inscribed in the light-guiding core of the light guide for example over a region of roughly 5 mm. This region is referred to as fiber Bragg sensor.

Advantageously, one or more fiber Bragg sensors are not connected to the sensor arm for the temperature compensation, so that they are uninfluenced by the elongation and merely provide information regarding the temperature. To ensure that no errors because of pull on the light guide influence the temperature compensation, these fiber Bragg sensors are preferentially arranged on the end side of the sensor arm or elsewhere in the sensor arm without being subjected to pull, for example transversely to the longitudinal extension of the sensor arm in regions that are not torsionable or only slightly so. These fiber Bragg sensors can then be preferentially used also for determining the temperature.

According to a further advantageous design of a pig according to the invention, the light guide, which can comprise one or more light-guiding fibers, is looped through a plurality of the sensor arms. When using Bragg gratings, only one light-guiding fiber can be used in particular, in the case of which the variation of the light by using the different Bragg gratings, provides information regarding the form of the sensor arms passed through. Looping the light guide through a plurality of the sensor arms ensures a simple construction and a process-secure assembly. At the same time, the number of the possible error sources is reduced by reducing the number of the necessary outputs into the evaluation electronics.

Accordingly it is advantageous to provide for in each case one rim of sensor arms in each case one light guide connection to an interrogator for incoming and outgoing light. The irradiated light is varied by the fiber Bragg sensors depending on elongation and/or torsion of the sensor arm and reflected in the direction of the light guide connection. Thus, the light guide can have an open end in the sensor rim which can be used in particular for the temperature compensation.

While it is possible in or on each sensor arm to lay an individual light guide with its own interrogator, the number of the light guide connections, in a further design according to the invention, can remain low, i.e. preferentially in the single-digit range, depending on the used interrogator or depending on the used interrogators, so that either a redundancy is achieved in the respective sensor arms by light guides running in parallel or individual sections of a sensor rim are passed through by respective light guides in the circumferential direction.

In a connecting region, the connection of the light guide is particularly provided via a glass fiber reinforced elastomer composite. Such a transition from a sensor arm constructed for example of a glass fiber reinforced plastic with a correspondingly integrated light guide prevents severe kinks and an impermissible loading of the light guide.

Preferentially, the interrogator for evaluating the light signal is pressure-grouted, so that the use of pressure chambers or pressure bodies which are in particular created by means of metallic materials, can be avoided. Accordingly, the pig can be designed lighter and is useable for low pressure gas lines below operating pressures of 10 bar.

Finally, the object set at the outset is likewise solved by a pig which in particular is designed in the form of a cleaning or inspection pig, which comprises a central unit and at least one, in the longitudinal direction of the central unit, front and rear sealing unit, and which is provided with at least one sensor device comprising a plurality of sensor arms, which is provided in particular for the measurement of a geometry or condition of the pipeline, wherein at least one of the sealing units and the central unit are produced from a plastic material at least in sections, wherein the central unit comprises an inner region that is substantially without differential pressure during the operation in the pipeline, and is preferentially formed of a plastic that is reinforced in particular by fibers. Such a pig, which does not comprise any foam material plugs as sealing elements and does not comprise a metallic pressure body or a metallic pressure chamber, can be largely constructed subject to omitting metallic wall elements and accordingly is well suitable for low-pressure gas lines.

For forming a central unit with a differential pressure-less inner region, the same comprises recesses. Accordingly, an at least almost identical pressure materializes in the ambient region located radially from the longitudinal center axis of the pig and the recesses further outside and the inner region. For example, the central unit can comprise a multiplicity of recesses, i.e. which are constructed skeleton-like or are constructed also using plastic bars.

Preferentially, in particular the sensor arm and/or the central unit are formed from a plastic or plastic material that is in particular reinforced by fibers. In particular glass fiber plastics but also carbon fiber reinforced plastic, aramid fiber reinforced plastic, polyamide or polyetheretherketone can thus be used as plastics or plastic material. The materials of the modular unit described at the outset with sensor arms and sealing unit thus preferentially comprise a polyurethane, in particular also fiber-reinforced polyurethane, for the areal element of the sealing element and a glass fiber material for the sensor arms, in which or on which the light guide is present.

For the purpose of further optimizations of the elastic properties of the sensor arm, the same can be provided with a damping layer at least on one side, via which in particular the natural vibrations of the sensor arm are dampened and vibration energy is converted into heat. The damping layer is preferentially constructed of a polyurethane and, in particular with regards to its damping characteristics, can be matched to the natural frequencies of the sensor arm.

The damping layer is preferentially 1 to 2 mm thick and is applied areally regarding the travelling direction of the pig to the back of the sensor arm. Preferentially it covers at least substantially, in particular completely the rearward surface.

It is advantageous, furthermore, when the pig comprises an energy storage unit that is arranged without a pressure chamber, in order to create a light pig even when omitting the pressure bodies which are formed from metal.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Individual technical features of the exemplary embodiments described below can also be combined with previously described exemplary embodiments and the features of the independent claims and any further claims regarding objects according to the invention. Provided it is practical, elements that have the same functional effect are marked with identical reference numbers.

Figure 1:
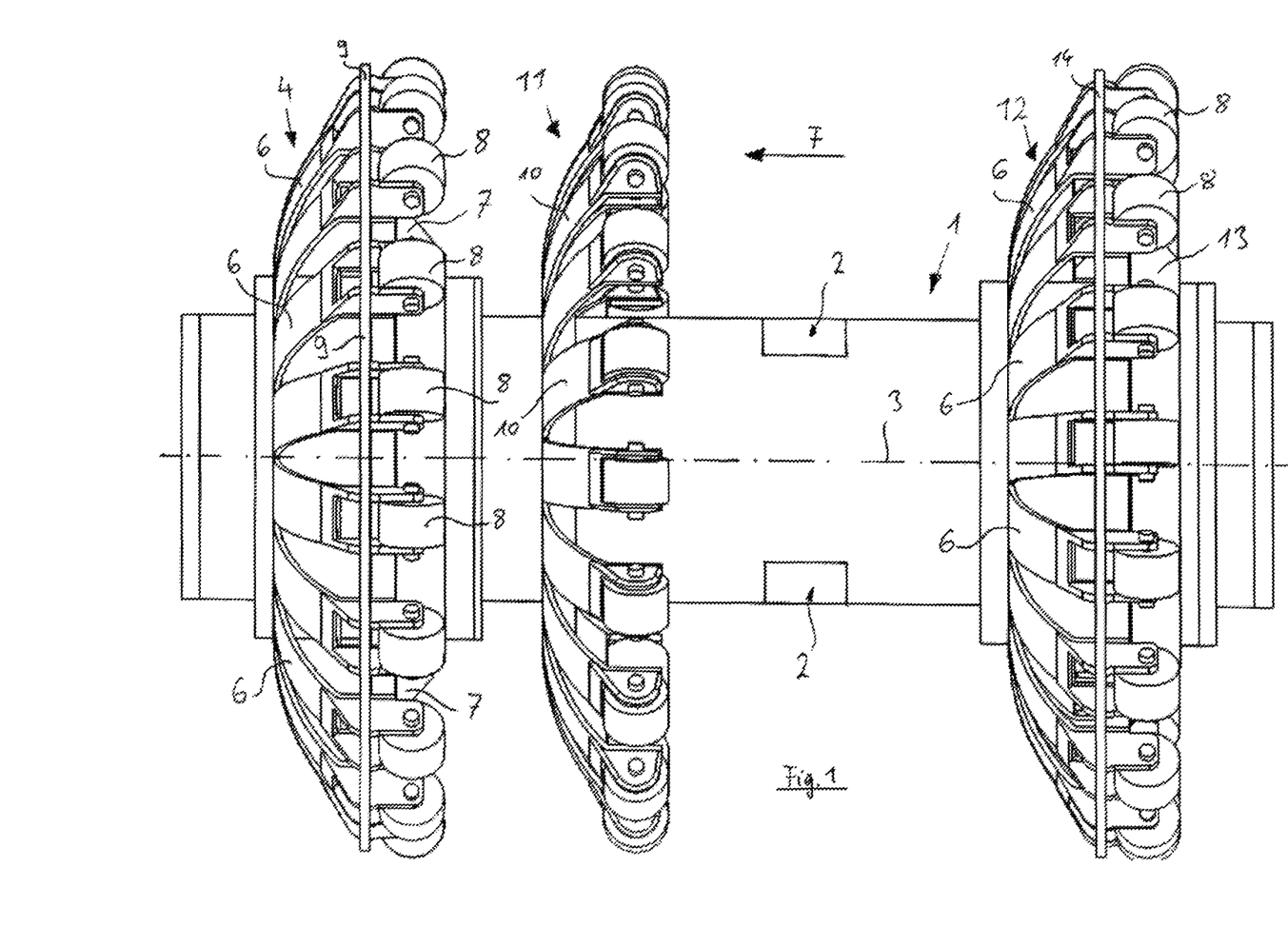
FIG. 1 shows an object according to the invention in a lateral view.

A pig according to the invention is shown in FIG. 1 according to a first exemplary embodiment in a lateral view. Notwithstanding this, a longitudinal center axis of the pig is translucently drawn in. In an unloaded state of the guide elements, the same is at least almost identically correlated with the longitudinal center axis of a pipeline passed through by the pig designed here as inspection pig.

The pig comprises a central unit 1, which in this case is provided with two recesses 2, by way of which a pressure applied outside the central unit 1 between the sealing elements is present also in the interior of the central unit. Thus, the pig during the operation is designed at least substantially without differential pressure, in the optimum case entirely without differential pressure regarding an outer surroundings of the pig in the pipeline (FIG. 3) adjoining the recesses 2. An inner region 5 for this purpose has an almost or entirely identical pressure to the outer region 5.1 adjoining the recesses. Furthermore, the pig comprises a longitudinal center axis 3, which when travelling through a linear pipeline section is formed parallel to the travelling direction F. With regard to the travelling direction F, there is a front sensor rim 4 comprising multiple sensor arms 6, which are connected to a front sealing unit 7. The sensor arms 6 are part of a sensor device which in this case is designed for determining the geometry of the inner surface of the pipeline. On the end side of the sensor arms 6, rollers 8 as guide means are arranged, which, via a mounting formed as part of the sensor arm or connected with the same, are arranged on the same and on the sealing unit 7.

Preferentially, further spring arms, in particular such formed from GRP material, can be arranged as guide arms or guide means on the central unit.

Viewed in the travelling direction, the sensor arms 6 are substantially arranged in front of the sealing unit 7, merely the mounting of the rollers 8 and the rollers themselves are arranged behind the sealing plane delimited by an edge 9 on the circumferential side.

A further sensor rim 11 is arranged behind the front sealing unit. The sensor arms 10 of the same can be formed from a plastic material other than the front sensor arm 6 and in particular also than the central unit 1.

A rear rim 12 of sensor arms 6 is part of a further sensor device, which is connected to a rear sealing unit 13. Both the front sealing unit 7 and also the rear sealing unit 13 comprise the connection between sensor arm and sealing unit according to the invention, so that an optimal regulation of the friction already reduced by the means 8 formed by the rollers for guiding anyhow is brought about. The sensor arms 6 of the rear sensor rim 12 also comprise wheels 8 which in the travelling direction are arranged behind the circumferential-side face edge 14 of the rear sealing unit 13.

Both the front sealing unit 7 and also the rear sealing unit 13 comprise a connection with the sensor arms 6 which are each spaced from the central unit 1 via a flexible section A. The sealing units 7 and 13 are constructed from polyurethane and comprise an areal element leading about the central unit 1 viewed in the longitudinal direction of the pig, which areal element is codefined via the connection 16 between sensor arm and sealing unit. On the side which regarding the travelling direction F faces towards the front, both the sealing unit 7 and also the sealing unit 13 comprise faces or sections of the areal element, the surface normals N of which point in the direction of the longitudinal (center) axis 3 or are angled towards the same. Upon the increase of pressures that are present behind the pig because of for example weld seams or bend passages, the increased friction on the outer circumferential-side face edges 9 and 14 of the respective face element and the wheels 8 is counteracted by the increased differential pressure, so that any passages can be easily passed over or traveled through.

Figure 2:
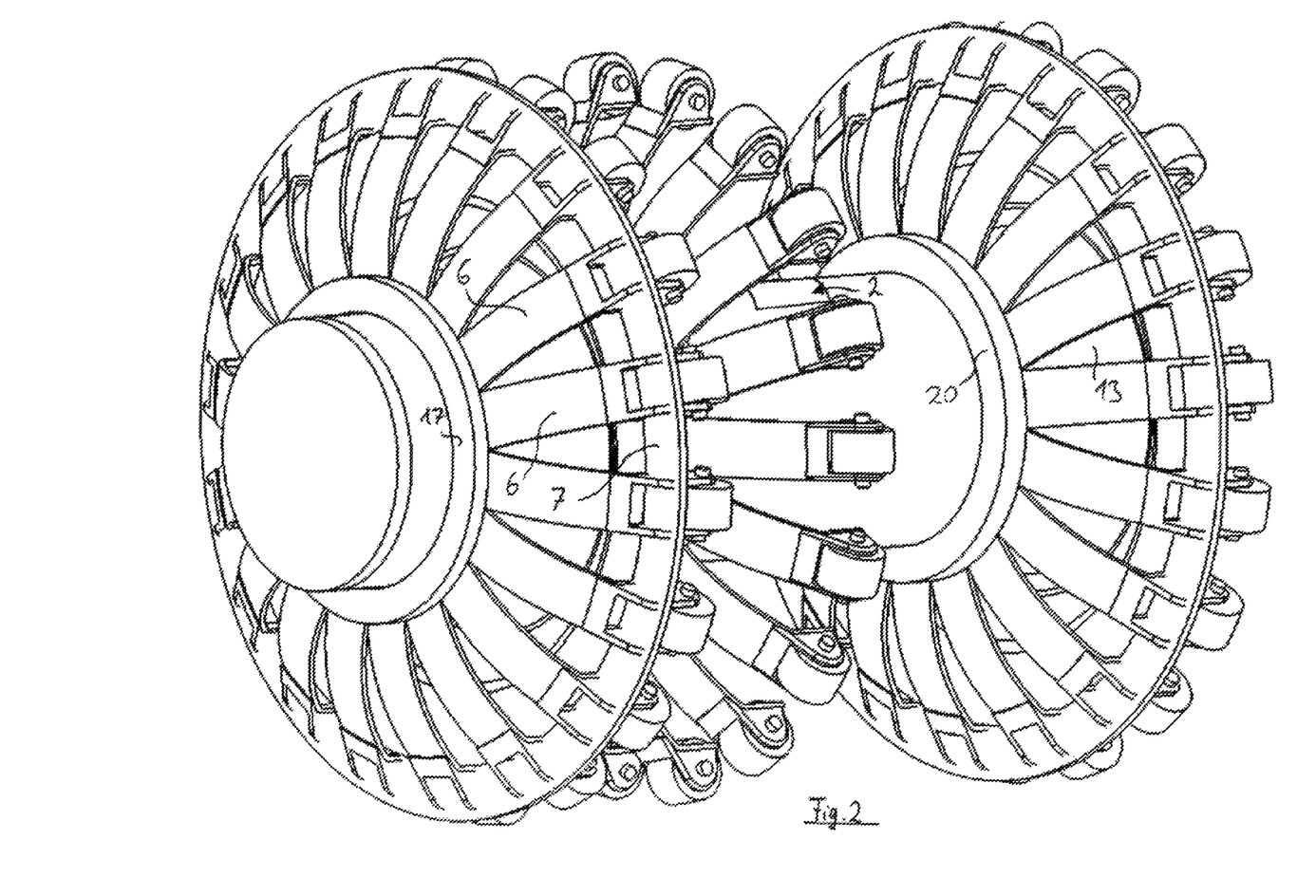
FIG. 2 shows the object according to FIG. 1 in a perspective view.
Figure 3:
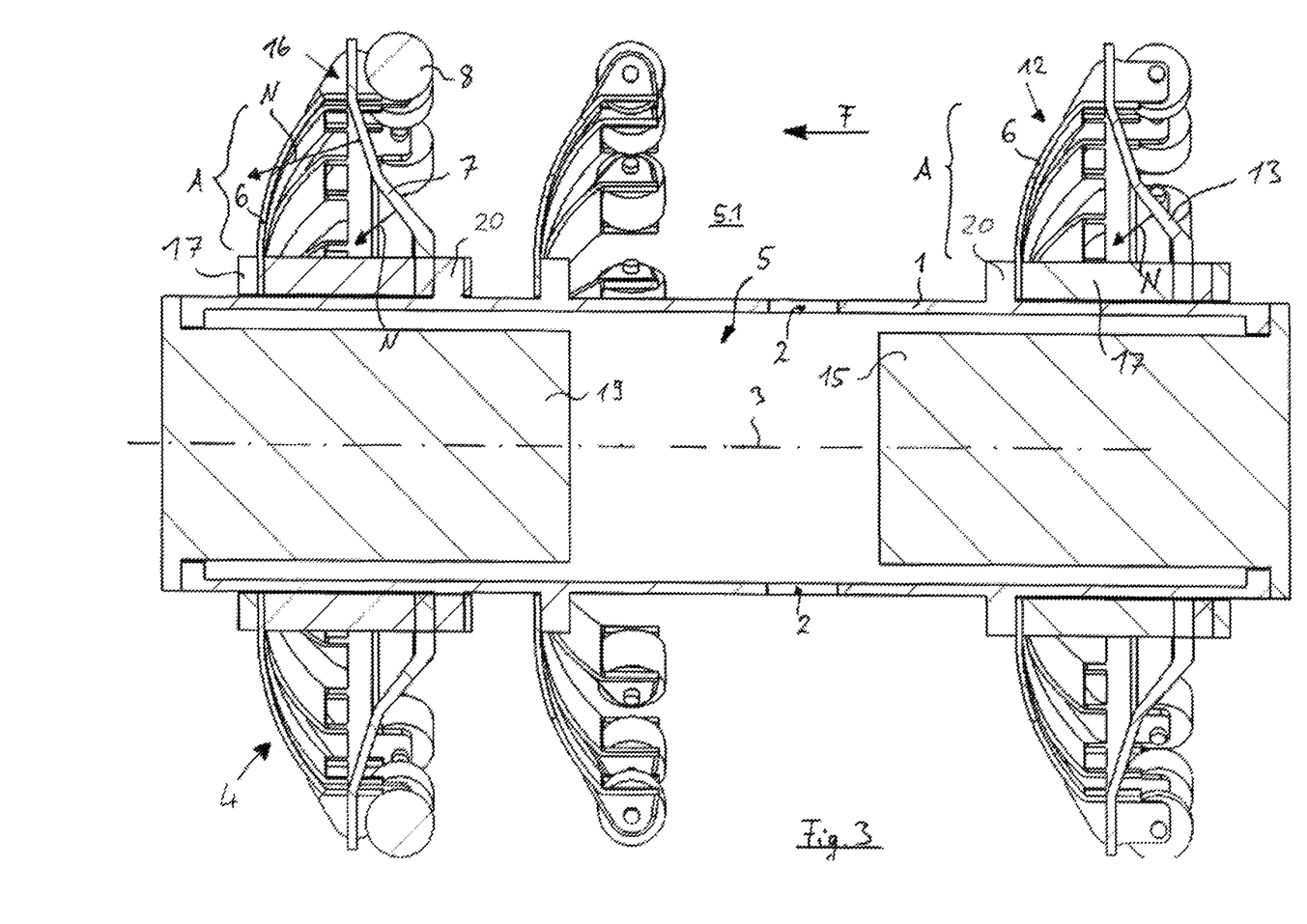
FIG. 3 shows the object according to FIG. 1 in a longitudinal section.
Figure 4:
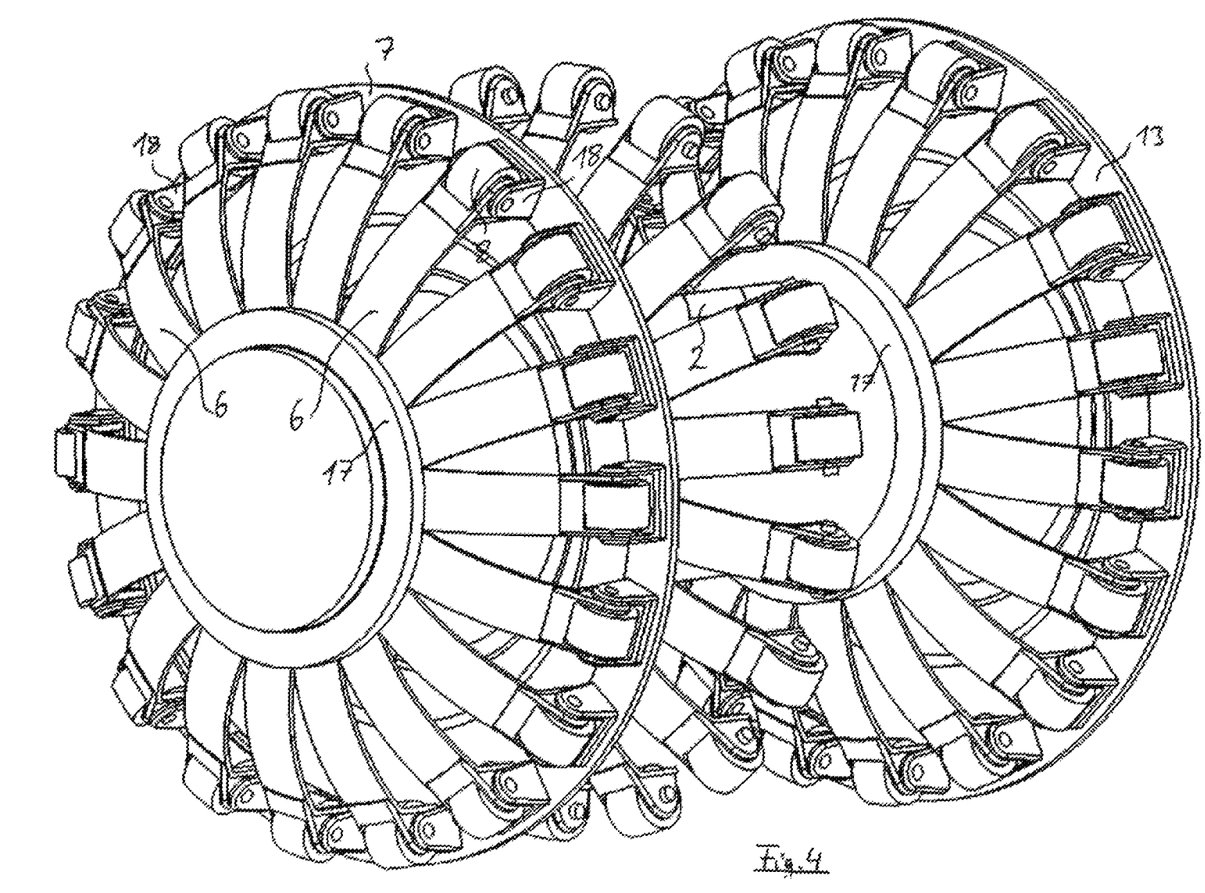
FIG. 4 shows a further exemplary embodiment of the invention in a perspective representation.

Shown, furthermore, is the modular construction of the pig with a central unit 1 and the bonded-on or detachably attached modules of sealing unit 7 and the associated sensor rim 4 and 12, which are both preferentially arranged in a base 17 of the module produced from PU (FIGS. 2 to 4). The same are slid onto the central unit up to the stops 20.

According to a further exemplary embodiment of the invention, the sensor arms 6 are likewise again connected to the sealing units 7 and 13, however the guide means 8 designed as rollers are now located on the side of the sealing unit (FIG. 4) directed towards the front. The connection between sensor arm 6 and sealing unit 7 and 13 is effected by way of a substantially U-shaped mounting 18 that is bonded and/or screwed to the sealing unit that is preferentially produced from polyurethane. This mounting 18 is fixed on the sensor arm 6 preferentially in an articulated manner with in particular the axis of rotation of the roller as pivot axis (FIG. 4).

Figure 5:
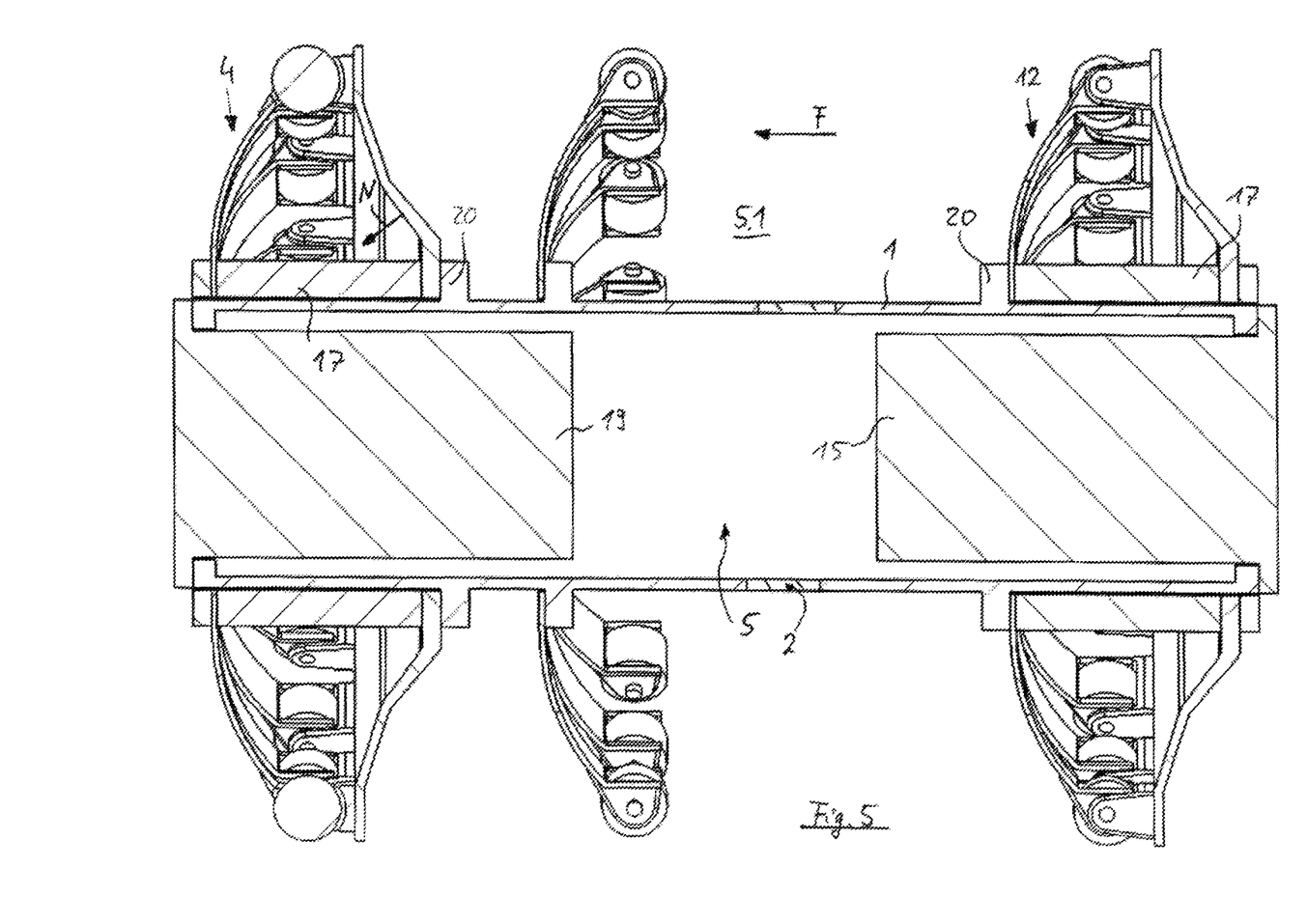
FIG. 5 shows the object according to FIG. 4 in a longitudinal section.

Both exemplary embodiments comprise two grouted electronic blocks 15 and 19 bonded into the differential pressureless central unit 1. Both electronic blocks 15, 19 each comprise an interrogator (not shown) for the purpose of querying the light guides that are present in the sensor rims 4 and 12 and associated electronics and energy storage units (FIG. 5).

Figure 6:
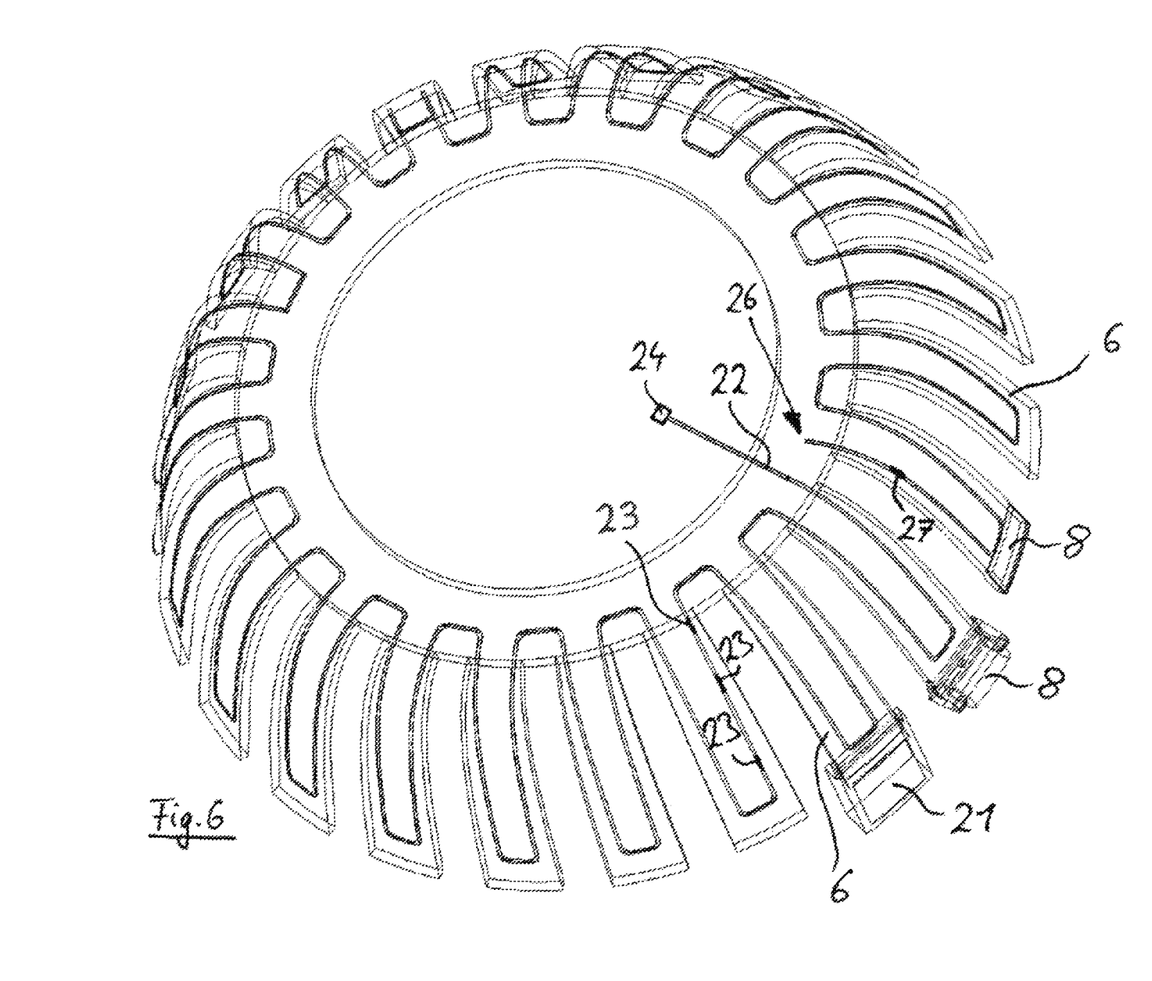
FIG. 6 shows a part of a sensor device of an object according to the invention.

In FIG. 6, a sensor rim equipped with different modules located outside is shown. Besides a sensor unit 21 for examining the pipeline wall for defects, a roller on the one hand and a simple ceramic disk on the other hand are arranged as guide means 8.

A single light guide 22 with a plurality of Bragg gratings 23 in each sensor arm (only partly shown) is looped through all sensor arms 6 of the sensor rim and therefore merely comprises one connecting region 24. This connecting region is guided into the PU of the respective base via a GRP-PU composite region, so that as damage-free as possible a feed-through into the respective interrogator of the block 19 or 15 is made possible. Alternatively, an interrogator with a multiplexer can also evaluate a plurality of sensor rims.

Figure 7:
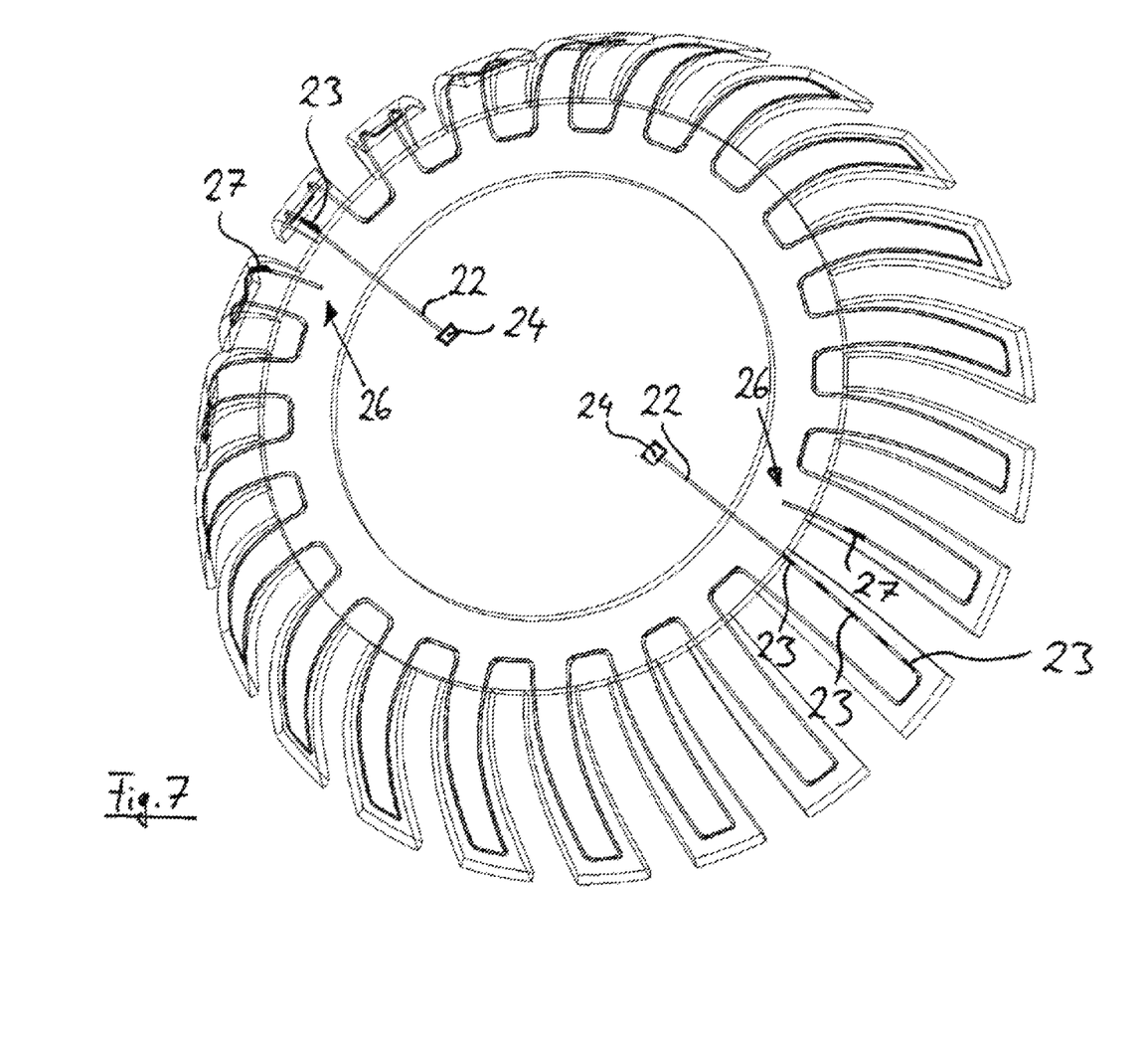
FIG. 7 shows a part of a sensor device of a further object according to the invention.

According to FIG. 7, a sensor rim can also comprise light guides which are arranged in the circumferential direction one after the other. In this case, two light guide connections 24 are necessary. With this construction, measurements are still possible upon failure of a light guide via the other half of the sensor rim. As also in the exemplary embodiment according to FIG. 6, the light guides according to FIG. 7 have open ends 26 the associated fiber Bragg sensor 27 of which for the temperature determination and compensation is not bonded.

The invention claimed is:

1. A pig for pipelines, the pig comprising:
   a central unit;
   at least one of a front sealing unit and a rear sealing unit in the longitudinal direction of the central unit;
   at least one sensor device comprising a plurality of sensor arms which is provided for the measurement of a geometry or condition of the pipeline;
   wherein at least one of said at least one of a front sealing unit and a rear sealing unit, and the central unit are produced from a plastic material at least in sections,
   wherein at least one sensor arm, which is positioned distant from the central unit, is connected to one of the sealing units.

2. The pig as claimed in claim 1, wherein a connection between sensor arm and a said sealing unit is arranged distantly from the central unit via a flexible section A of the sensor arm.

3. The pig as claimed in claim 1, wherein at least one said sealing unit comprises at least one areal element which viewed in the longitudinal direction of the pig is led about the central unit.

4. The pig as claimed in claim 1, wherein at least one said sealing unit is codefined by the sensor arm.

5. The pig as claimed in claim 1, wherein at least one said sealing unit, on its side facing to a front in the travelling direction, comprises at least one face, the surface normal N of which viewed in a longitudinal section is inclined in the direction of the longitudinal axis of the pig.

6. The pig as claimed in claim 1, wherein the sensor arm on an end side comprises at least one wheel for guiding the pig.

7. The pig as claimed in claim 1, wherein at least one sealing unit and the sensor arms connected therewith form a module which is detachably fixed to the central unit.

8. The pig for pipelines, the pig comprising:
   a central unit;
   at least one of a front sealing unit and a rear sealing unit in the longitudinal direction of the central unit;
   at least one sensor device comprising a plurality of sensor arms, said sensor device being provided for the measurement of a geometry or condition of the pipeline;

wherein at least one sealing unit and the central unit are produced from a plastic material at least in sections, wherein the sensor device comprises at least one light guide extending in or along the sensor arm, which is designed for the measurement of at least one of curvature and torsion of a sensor arm.

9. The pig as claimed in claim 8, wherein the light guide is assigned at least one Bragg grating.

10. The pig as claimed in claim 8, wherein the light guide is looped through a plurality of the sensor arms.

11. The pig as claimed in claim 8, wherein for a rim of sensor arms, only one light guide connection to an interrogator for incoming and outgoing light is provided in each case.

12. The pig as claimed in claim 11, wherein the interrogator is pressure-grouted.

13. The pig as claimed in claim 8, wherein a connection of the light guide is effected by way of a GRP elastomer composite.

14. A pig for pipelines, the pig comprising:
a central unit;
at least one of a front sealing unit and a rear sealing unit in the longitudinal direction of the central unit;
at least one sensor device comprising a plurality of sensor arms, which is provided for measurement of a geometry or condition of the pipeline;
wherein at least one of the sealing units and the central unit are produced from a plastic material at least in sections,
wherein during the operation the central unit in the pipeline comprises an at least substantially differential pressure-less inner region and is formed from a plastic that is reinforced in particular by fibers.

15. The pig as claimed in claim 14, wherein the central unit comprises recesses.

16. The pig as claimed in claim 14, wherein the sensor arm is formed from a plastic that is reinforced in particular by fibers.

17. The pig as claimed in claim 14, wherein the sensor arm is formed with a damping layer at least on one side.

18. The pig as claimed in claim 14, wherein the pig comprises an energy storage unit that is arranged without a pressure chamber.

* * * * *